United States Patent
Lu et al.

(10) Patent No.: US 7,932,302 B2
(45) Date of Patent: Apr. 26, 2011

(54) RADIATION CURABLE URETHANE (METH)ACRYLATE POLYMER AND ADHESIVES FORMULATED WITH THEM

(75) Inventors: Victor Lu, Smyrna, GA (US); Jeffrey Wang, Smyrna, GA (US)

(73) Assignee: Cytec Surface Specialties, S.A., Bruxelles (BE)

( * ) Notice: Subject to any disclaimer, the term of this patent is extended or adjusted under 35 U.S.C. 154(b) by 668 days.

(21) Appl. No.: 11/919,402

(22) PCT Filed: Apr. 28, 2006

(86) PCT No.: PCT/EP2006/004011
§ 371 (c)(1),
(2), (4) Date: Oct. 26, 2007

(87) PCT Pub. No.: WO2006/117156
PCT Pub. Date: Nov. 9, 2006

(65) Prior Publication Data
US 2009/0324961 A1    Dec. 31, 2009

Related U.S. Application Data

(60) Provisional application No. 60/676,296, filed on May 2, 2005.

(51) Int. Cl.
*C08J 3/28* (2006.01)
*C08G 18/69* (2006.01)
*C08L 75/00* (2006.01)

(52) U.S. Cl. .............. 522/90; 522/95; 522/111; 528/65; 525/127

(58) Field of Classification Search .............. 522/90, 522/93, 95, 98, 111; 528/65; 525/127
See application file for complete search history.

(56) References Cited

U.S. PATENT DOCUMENTS

| | | | |
|---|---|---|---|
| 4,041,104 A | 8/1977 | Selley | |
| 4,295,909 A | 10/1981 | Baccei | |
| 4,587,201 A | 5/1986 | Morikawa et al. | |
| 4,786,586 A | 11/1988 | Lee et al. | |
| 5,283,265 A | 2/1994 | Kimura et al. | |
| 5,352,712 A * | 10/1994 | Shustack | 522/31 |
| 5,747,551 A | 5/1998 | Lewandowski et al. | |
| 6,060,560 A * | 5/2000 | St. Clair | 525/124 |
| 6,235,397 B1 * | 5/2001 | Nakayama et al. | 428/423.1 |
| 6,332,291 B1 * | 12/2001 | Flosbach et al. | 522/91 |
| 6,852,771 B2 * | 2/2005 | Balch et al. | 522/135 |
| 7,119,160 B2 * | 10/2006 | Kodama et al. | 528/75 |

* cited by examiner

*Primary Examiner* — Susan W Berman
(74) *Attorney, Agent, or Firm* — Wenderoth, Lind & Ponack, L.L.P.

(57) ABSTRACT

UV curable urethane (meth)acrylate polymers of Formula (1), where: $R_1$ and $R'$ are each independently hydrogen or $C_{1-20}$ hydrocarbo, $R_2$, $R'_2$, $R_3$ and $R_4$ are each independently optionally substituted divalent organo group, and p is an integer from about 6 to about 100 which are useful as laminating and/or pressure sensitive adhesives are disclosed as is methods of making them. The oligomers/polymers comprise a urethane extended backbone formed by reacting diisocyanates with polyols derived from rubber oligomers/polymers.

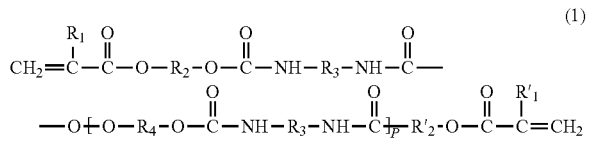

18 Claims, No Drawings

RADIATION CURABLE URETHANE (METH)ACRYLATE POLYMER AND ADHESIVES FORMULATED WITH THEM

This application claims the benefit of U.S. Provisional Application Ser. No. 60/676,296 filed May 2, 2005.

The present invention relates to optionally warm-melt radiation curable adhesives and methods of making them. Adhesives of the invention may comprise backbone extended urethane (meth)acrylate oligomers and/or polymers which may be further polymerizable with radiation. Such oligomers/polymers for example comprise vinyl copolymer rubber based polyurethane terminated with hydroxyl(meth)acrylate groups.

Radiation curable adhesives are of continuing commercial interest as they can be cured immediately resulting in high production output, reduced work in progress, reduced energy consumption, reduced floor space and low or no emissions of undesirable components such as volatile organic compounds (VOC) or isocyanates. However, despite these advantages to replace the conventional solvent, water and/or hot melt adhesives, radiation curable adhesives must demonstrate an exceptional balance of adhesive performance without introducing new concerns and shortcomings. Moreover, they must do so at a cost that, together with its benefits, provides added value to the end user. This is truly a formidable challenge.

The viscoelasticity of an adhesive refers to the balance of both flow (viscous property) and stiffness (elastic property). As such it governs macromolecular flow, deformation, resistance to deformation and energy dissipation and therefore impacts both the bonding and debonding aspects of adhesion.

In conventional polyurethane elastomeric adhesives the polyurethane backbone contributes flexibility/elongation and hydrogen bonding to produce exceptional adhesion, heat resistance and toughness. Although many factors may be involved, and without wishing to be bound by any mechanism, it appears that inherent molecular structure and crosslink density may both playing useful roles in determining adhesion performance.

Flexible polyurethane elastomers comprise a structure of two segment types: soft segments of long and flexible polyol chains and hard segments of relatively short rigid polyurethane/polyurea linkages. It is believed that the characteristic properties of the resultant elastomer may depend largely upon secondary or hydrogen bonding of polar groups in the polymer chains. Hydrogen bonding between NH groups and the C=O (carbonyl) groups within the hard urethane segments is strong, causing the hard segments to agglomerate into domains within structures having long flexible chains. A two phase structure of hard and soft segments is formed.

The crosslinking density of a conventional cured polyurethane network can be measured by the average equivalent weight per branch point in the crosslinked polymer network, designated as $M_c$. This will typically vary from 2,000 for a flexible material to about 25,000 for a very soft elastic material. Therefore, conventional soft, flexible, high elongation polyurethanes are mainly linear in structure and posses a relatively low degree of branching.

Since the midlate 1960's, there have been various radiation curable (meth)acrylated urethane oligomeric adhesives, such as the following:

U.S. Pat. No. 5,559,164, U.S. Pat. No. 5,859,088, and WO 98/23,699 disclose adhesive compositions comprising polymers comprising $C_6$ to $C_{12}$ saturated α-olefin monomers and $C_2$ to $C_5$ α-olefin monomers and an effective amount of photoactive crosslinking agent to crosslink composition upon radiation.

JP 2002309185 discloses the composition of radiation curable PSA. The three compositions are: (a) (meth)acrylated functionalized polyurethane (b) aliphatic or alicyclic alkyl (meth)acrylate having a carbon number equal to or greater than 6, and (c) photoinitiator. The polyurethane is synthesized by first making a hydrogenated polybutadiene polyol react with a polyisocyanate compound and secondly making an isocyanate group terminated compound obtained in the preceding step react with hydroxyl group-containing (meth) acrylate. The length of backbone is short, and the number of repeating urethane bonds is limited in 2-5. No tackifier as an essential effective component was mentioned.

In JP 2003155455 actinic energy ray-curable pressure sensitive adhesive contains: (a) (meth)acrylated functionalized polyurethane, (b) ethylenically unsaturated monomers, and optionally (c) photo-polymerization initiators. In synthesis of the polyurethane, polyisocyanate reacted with 2 types of hydrogenated polybutadiene based polyols with different Mw's, and then the product reacted with hydroxyl functionalized (meth)acrylate, and subsequently with saturated alcohols. No tackifier as an essential effective component was mentioned.

JP 2002322454 describes radiation curable removable pressure sensitive adhesives that contain a special urethane (meth)acrylate. The urethane (meth)acrylate is synthesized by the reaction of at least one polyol from silicone polyols, 1,4-polybutadiene diols, hydrogenated 1,4-polybutadiene diols, methylene glycols, and/or fluoro/perfluoroallylene polyols with at least one of diisocyanate compounds and at least one of hydroxy(meth)acrylates. No acrylic monomer and tackifier as essential effective components were mentioned.

U.S. Pat. No. 5,391,602 discloses compositions of a radiation cured PSA in which the polyurethane is derived from polyoxypropylene or polyoxyethylene diols.

Both U.S. Pat. No. 5,087,686 and DE 3,709,920 describe radiation curable polyurethane oligomers capped with acrylates and alcohol and which are used in PSA. The polyurethane is derived from polyether or polyester diols.

EP 289852 discloses radiation curable PSAs incorporating (a) partially hydrogenated polybutadiene based polyurethane acrylate, (b) chain transfer agent and (c) metal complexes of N-nitrosophenylhydroxylamine.

U.S. Pat. No. 4,786,586 discloses acrylate terminated urethane oligomers having a polybutadiene or polybutene backbone and which are used as photoemulsion laminating adhesives.

U.S. Pat. No. 4,789,625 describes laminating adhesives containing acrylate terminated urethane oligomers in which the backbone is derived from an alkanediol.

JP 2004-143233 describes radiation-curable adhesives with balanced adhesion and weather resistance. The compositions contain (a) urethane (meth)acrylate, which comprise polyol-polyisocyanate reaction products forming urethane linkages with hydroxy groups of carboxy-containing monools/polyols and hydroxy containing (meth) acrylates; and (b) (meth)acrylate monomers. No tackifier as an essential effective component was mentioned.

JP 11050025 and JP 10265742 very similarly describe radiation-curable pressure sensitive adhesive compositions contain acrylic terminated polybutadiene and acrylic monomers.

U.S. Pat. No. 5,883,148 discloses that UV-curable PSA comprises (a) photoinitiator, (b) polyurethane with pendant acrylates and with Mn of 500-200,000; (c) acrylate monomers with Mn of 500-5,0000; (d) acrylated polybutadiene with Mn of 500-500,000 and (e) tackifying agent.

U.S. Pat. No. 5,747,551 discloses that UV-curable PSA comprises (a) photoinitiator, (b) polyurethane with pendant acrylates, and with Mn of 500-200,000; (c) acrylate monomers with Mn of 500-5,0000; (d) acrylated polybutadiene with Mn of 4,000-6,000 and (e) tackifying agent.

U.S. Pat. No. 6,486,229 discloses a radiation curable hot-melt PSA comprises (a) at least one high vinyl, radial-block styrene-butadiene block copolymer; (b) at least one high vinyl, linear styrene-butadiene-styrene or styrene-isoprene-styrene or multi-block styrene-butadiene copolymer; (c) at least one high diblock conventional low vinyl styrene-butadiene-styrene or styrene-isoprene-styrene copolymer; (d) at least one solid tackifier; (e) at least one oil or liquid tackifier; (e) at least one photoinitiator; (f) at least one antioxidant.

U.S. Pat. No. 5,804,663 discloses radiation curable adhesive that has the general formula $(AB)_p(B1)_qX$, where A=poly(vinyl aromatic content, B and B1=poly(butadiene) blocks, X=the residue of a hexavalent coupling agent p and q=1-4.5.

U.S. Pat. No. 5,066,728 and WO 9206125 describe phenylbutadiene multiblock copolymers for radiation curable PSA. These phenylbutadiene multiblock copolymers comprise endblocks of phenylbutadiene and an elastomeric midblock of a conjugated diene such as isoprene and butadiene, where the multiblock copolymers are crosslinkable by electron beam.

JP 02199184 describes radiation curable PSA that comprises (a) acrylate-terminated hydrogenated polybutadiene; (b) acrylate-terminated polypropylene glycol; (c) chain-transfer agents and (d) thermal polymerization inhibitor.

JP 01156386, JP 08019382, JP 63197780, and JP 01156385 similarly with minor differences disclose radiation curable PSA's that comprise (a) double bond-terminated 1,2-polybutadiene; (b) chain transfer agents such as SH groups-containing compounds and (c) thermal polymerization inhibitor.

JP 63178184 discloses radiation curable PSA that comprises (a) unsaturated acrylic oligomers, (c) chain transfer agents, (d) phosphate derivatives and (e) unsaturated polybutadiene derivatives. Unsaturated acrylic oligomers were prepared by treating a copolymer of Et acrylate, Bu acrylate and methylglycidyl acrylate with acrylic acid. Unsaturated polybutadiene derivatives prepared by reactions of OH-terminated polybutadiene with TDI and 2-hydroxylethyl acrylate.

JP 57209976 discloses radiation curable PSA contains diene polymers have pendant ester group and reactive diluents (monomers).

Despite expectations that the use of radiation curable adhesives would grow explosively, this has never fully materialized. This is due to the many technical challenges that needed to be overcome to replace existing adhesive technologies. For example in prior art radiation cured adhesive systems the balance between viscous and elastic properties, between molecular weight and crosslinking density (measured by $M_c$), and/or between tack, adhesion and cohesion was not well controlled.

A paper by Ozawa et al (Takehiro Ozawa, Shinichi Ishiwata, Yoshihisa Kano, Furukawa Review (2001). 20, 8388) shows how the balance of adhesive and cohesive strength of cured coatings effects their properties as UV curable PSAs. The method described in the paper delivers UV energy to the wet film in a controlled and efficient fashion. Various adhesive blends (both those cured and uncured by UV) were tested using DSC (differential scanning calorimetry) and DCA (dynamic contact angle). The data show that probe tack and peel adhesion decreased monotonically with an increase of storage moduli E' and loss moduli E" while the holding power of the adhesives was higher. Modulus values and glass transition temperatures ($T_g$) of the adhesive blends increase after UV irradiation as it is believed that the deformation energy of UV cured blends was reduced by the curing process.

Radiation curable formulations comprising high molecular weight oligomers are often diluted with low molecular weight (i.e. low viscosity) monomers. Without wishing to be bound by any mechanism it is believed that dilution improves the handling and viscosity of the formulation and can impart flexibility and elongation. Suitable diluting monomers may have mono, di, tri or higher functionality. The higher molecular weight oligomers may comprise two or more terminal (meth)acrylate groups, which can become branch points, after the oligomer is cured or copolymerized or crosslinked with monomers.

The more functional groups on each monomer and/or oligomer, the lower the $M_c$, of the cured formulation i.e. the higher the crosslinking density. A denser network may exhibit higher tensile strength, lower elongation, higher $T_g$, higher hardness and/or a more rigid product. However too much functionality may lead to excessive crosslinking which can reduce the degree of radiation curing. To address this, the number of unsaturated double bonds on the monomer and/or oligomer may be minimized, although too little functionality may then produce cured formulations with insufficient cohesion strength.

To provide an adhesive formulation with good performance the viscoelastic properties of the formulation (and other such as surface energy and/or surface tension) must all be considered. The present invention addresses some or all of the aforementioned problems with prior art adhesives.

Therefore broadly in accordance with the present invention there are provided oligomers/polymers of Formula 1:

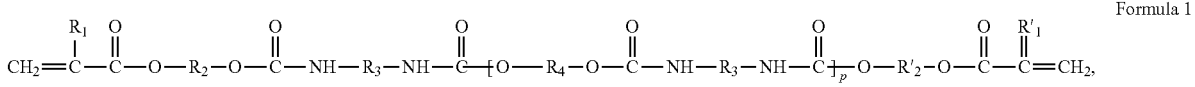

Formula 1 where:

$R_1$ and $R'_1$ are each independently hydrogen or $C_{1-20}$hydrocarbo, $R_2$, $R'_2$, $R_3$ and $R_4$ are each independently optionally substituted divalent organo group, and p is an integer from about 6 to about 100.

Preferably in Formula 1, $R_1$ and $R'_1$ are the same and (independently) $R_2$ and $R'_2$ are the same.

Preferably $R_1$ and $R'_1$ are each independently hydrogen or $C_{1-10}$alkyl, more preferably H or $C_{1-4}$alkyl, most preferably H or methyl for example H.

$R_2$ and $R'_2$ are each independently optionally substituted hydrocarbo, more preferably optionally substituted $C_{1-36}$-hydrocarbylene; most preferably $C_{1-18}$alkylene, such as $C_{1-4}$alkylene, for example ethylene.

Preferably $R_3$ is optionally substituted hydrocarbo, more preferably optionally substituted $C_{1-36}$hydrocarbylene; most preferably $C_{1-16}$alkylene, such as $C_{13}$alkylene for example

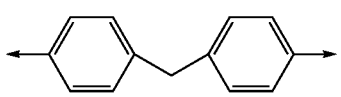

and the arrows denote linking bonds where $R_3$ attaches to the polymer backbone bonds.

Optionally $R_3$ may comprise one or more aryl groups.

Preferably $R_4$ comprises an organo residue obtained and/or obtainable from one or more polyols such as difunctional polyols with two hydroxyl functional groups at the end of chains. More preferably $R_4$ comprises optionally substituted $C_{20-60}$hydrocarbo, most preferably $C_{29-45}$ alkylene; for example $R_4$ has the Formula 2:

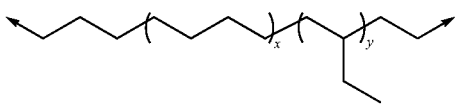

where x and y together add to from about 25 to about 40 and the arrows denote linking bonds where $R_4$ attaches to the polymer backbone The polyols used to form the linking group $R_4$ may obtained and/or obtainable from copolymerization of ethylene-butylene, or homo-polymerization of butadiene, or hydrogenation of polybutadiene, or copolymerization butadiene-acrylonitrile, or copolymerization of styrene-butadiene-styrene, or styrene-isoprene-styrene, or styrene-ethylene/butylene-styrene, or styrene-ethylene/propylene-styrene. The polyol(s) may be monodisperse compounds of molecular weight from about 500 to about 5,000 daltons, preferably from about 1,000 to about 4,000 daltons. Conveniently $R_4$ comprises a homo- and/or co-vinyl polymer rubbery moiety which comprise part of the polymer 'backbone, more conveniently $R_4$ is not derived from a polyester.

This organo residue is obtained and/or obtainable from one or more polyols, preferably, difunctional polyols with two hydroxyl functional groups at the end of chains. The polyols are obtained and/or obtainable from copolymerization of ethylene-butylene, or homo-polymerization of butadiene, or hydrogenation of polybutadiene, or copolymerization butadiene-acrylonitrile, or copolymerization of styrene-butadiene-styrene, or styrene-isoprene-styrene, or styrene-ethylene/butylene-styrene, or styrene-ethylene/propylene-styrene. The polyol(s) are monodisperse compounds of molecular weight of from about 500 to abut 5,000, preferably from about 1,000 to about 4,000 daltons.

Preferably in Formula 1 p is an integer from about 10 to about 60, more preferably from about 20 to about 40, most preferably from about 25 to about 35, for example about 30.

Unless the context clearly indicates otherwise, as used herein plural forms of the terms herein are to be construed as including the singular form and vice versa.

The term "comprising" as used herein will be understood to mean that the list following is non-exhaustive and may or may not include any other additional suitable items, for example one or more further feature(s), component(s), ingredient(s) and/or substituent(s) as appropriate.

The terms 'effective', 'acceptable' 'active' and/or 'suitable' (for example with reference to any process, use, method, application, preparation, product, material, formulation, compound, monomer, oligomer, polymer precursor, and/or polymer of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products. A preferred utility of the polymers of the present invention is as adhesives, more preferably pressure sensitive or laminating adhesives.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all suitable chemically possible combinations in the same moiety of a plurality of the aforementioned groups (e.g. amino and sulphonyl if directly attached to each other represent a sulphamoyl group). Preferred optional substituents comprise: carboxy, sulpho, hydroxy, amino, mercapto, cyano, methyl, halo, trihalomethyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen, silicon and/or sulphur, more preferably from hydrogen, nitrogen, oxygen, phosphorus and/or sulphur.

Most preferred organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all suitable chemically possible combinations in the same moiety of a plurality of the aforementioned carbon containing and/or heteroatom moieties (e.g. alkoxy and carbonyl if directly attached to each other represent an alkoxycarbonyl group).

The term 'hydrocarbo group' as used herein is a subset of a organic group and denotes any univalent or multivalent moiety (optionally attached to one or more other moieties) which consists of one or more hydrogen atoms and one or more carbon atoms and may comprise one or more saturated, unsaturated and/or aromatic moieties. Hydrocarbo groups may comprise one or more of the following groups. Hydrocarbyl groups comprise univalent groups formed by removing a hydrogen atom from a hydrocarbon (for example alkyl).

Hydrocarbylene groups comprise divalent groups formed by removing two hydrogen atoms from a hydrocarbon, the free valencies of which are not engaged in a double bond (for example alkylene). Hydrocarbylidene groups comprise divalent groups (which may be represented by "R$_2$C=") formed by removing two hydrogen atoms from the same carbon atom of a hydrocarbon, the free valencies of which are engaged in a double bond (for example alkylidene). Hydrocarbylidyne groups comprise trivalent groups (which may be represented by "RC≡"), formed by removing three hydrogen atoms from the same carbon atom of a hydrocarbon the free valencies of which are engaged in a triple bond (for example alkylidyne). Hydrocarbo groups may also comprise saturated carbon to carbon single bonds (e.g. in alkyl groups); unsaturated double and/or triple carbon to carbon bonds (e.g. in respectively alkenyl and alkynyl groups); aromatic groups (e.g. in aryl groups) and/or combinations thereof within the same moiety and where indicated may be substituted with other functional groups.

The term 'alkyl' or its equivalent (e.g. 'alk') as used herein may be readily replaced, where appropriate and unless the context clearly indicates otherwise, by terms encompassing any other hydrocarbo group such as those described herein (e.g. comprising double bonds, triple bonds, aromatic moieties (such as respectively alkenyl, alkynyl and/or aryl) and/or combinations thereof (e.g. aralkyl) as well as any multivalent hydrocarbo species linking two or more moieties (such as bivalent hydrocarbylene radicals e.g. alkylene).

Any radical group or moiety mentioned herein (e.g. as a substituent) may be a multivalent or a monovalent radical unless otherwise stated or the context clearly indicates otherwise (e.g. a bivalent hydrocarbylene moiety linking two other moieties). However where indicated herein such monovalent or multivalent groups may still also comprise optional substituents. A group which comprises a chain of three or more atoms signifies a group in which the chain wholly or in part may be linear, branched and/or form a ring (including spiro and/or fused rings). The total number of certain atoms is specified for certain substituents for example $C_{1-N}$organo, signifies a organo moiety comprising from 1 to N carbon atoms. In any of the formulae herein if one or more substituents are not indicated as attached to any particular atom in a moiety (e.g. on a particular position along a chain and/or ring) the substituent may replace any H and/or may be located at any available position on the moiety which is chemically suitable and/or effective.

Unless the context dictates otherwise, preferably any of the organo groups listed herein comprise from 1 to 36 carbon atoms, more preferably from 1 to 18. Unless the context dictates otherwise, it is particularly preferred that the number of carbon atoms in an organo group is from 1 to 12, especially from 1 to 10 inclusive, for example from 1 to 4 carbon atoms.

As used herein chemical terms (other than IUAPC names for specifically identified compounds) which comprise features which are given in parentheses—such as (alkyl)acrylate, (meth)acrylate and/or (co)polymer denote that that part in parentheses is optional as the context dictates, so for example the term (meth)acrylate denotes both methacrylate and acrylate.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms), conformers, salts, zwitterions, complexes (such as chelates, clathrates, crown compounds, cryptands/cryptades, inclusion compounds, intercalation compounds, interstitial compounds, ligand complexes, organometallic complexes, nonstoichiometric complexes, π adducts, solvates and/or hydrates); isotopically substituted forms, polymeric configurations [such as homo or copolymers, random, graft and/or block polymers, linear and/or branched polymers (e.g. star and/or side branched), crosslinked and/or networked polymers, polymers obtainable from di and/or trivalent repeat units, dendrimers, polymers of different tacticity (e.g. isotactic, syndiotactic or atactic polymers)]; polymorphs (such as interstitial forms, crystalline forms and/or amorphous forms), different phases, solid solutions; and/or combinations thereof and/or mixtures thereof where possible. The present invention comprises and/or uses all such forms which are effective as defined herein.

Polymers of the present invention may be prepared by one or more suitable polymer precursor(s) which may be organic and/or inorganic and comprise any suitable (co)monomer(s), (co)polymer(s) [including homopolymer(s)] and mixtures thereof which comprise moieties which are capable of forming a bond with the or each polymer precursor(s) to provide chain extension and/or cross-linking with another of the or each polymer precursor(s) via direct bond(s) as indicated herein.

Polymer precursors of the invention may comprise one or more monomer(s), oligomer(s), polymer(s); mixtures thereof and/or combinations thereof which have suitable polymerisable functionality.

A monomer is a substantially monodisperse compound of a low molecular weight (for example less than one kilodaltons) which is capable of being polymerised.

A polymer is a polydisperse mixture of macromolecules of large molecular weight (for example many thousands of daltons) prepared by a polymerisation method, where the macromolecules comprise the multiple repetition of smaller units (which may themselves be monomers, oligomers and/or polymers) and where (unless properties are critically dependent on fine details of the molecular structure) the addition or removal one or a few of the units has a negligible effect on the properties of the macromolecule.

A oligomer is a polydisperse mixture of molecules having an intermediate molecular weight between a monomer and polymer, the molecules comprising a small plurality of monomer units the removal of one or a few of which would significantly vary the properties of the molecule.

Depending on the context the broad term polymer may or may not encompass oligomers.

The polymer precursor of and/or used in the invention may be prepared by direct synthesis or (if the polymeric precursor is itself polymeric) by polymerisation. If a polymerisable polymer is itself used as a polymer precursor of and/or used in the invention it is preferred that such a polymer precursor has a low polydispersity, more preferably is substantially monodisperse, to minimise the side reactions, number of by-products and/or polydispersity in any polymeric material formed from this polymer precursor. The polymer precursor(s) may be substantially un-reactive at normal temperatures and pressures.

Except where the context indicates otherwise indicated herein polymers and/or polymeric polymer precursors of and/or used in the invention can be (co)polymerised by any suitable means of polymerisation well known to those skilled in the art. Examples of suitable methods comprise: thermal initiation; chemical initiation by adding suitable agents; catalysis; and/or initiation using an optional initiator followed by irradiation, for example with electromagnetic radiation (photo-chemical initiation) at a suitable wavelength such as UV; and/or with other types of radiation such as electron beams, alpha particles, neutrons and/or other particles.

The substituents on the repeating unit of a polymer and/or oligomer may be selected to improve the compatibility of the materials with the polymers and/or resins in which they may be formulated and/or incorporated for the uses described herein. Thus the size and length of the substituents may be selected to optimise the physical entanglement or interlocation with the resin or they may or may not comprise other reactive entities capable of chemically reacting and/or crosslinking with such other resins as appropriate.

Adhesives of the invention comprise oligomer(s) and/or polymer(s) which are preferably of relatively high molecular weight (as measured by $M_z$, $M_w$ and/or $M_n$). High molecular weight is believed to increase the strength of the uncured adhesives while maintaining a suitable viscosity of the final formulation so this can readily coat substrates in the warm melt state. The polydispersity of suitable oligomer(s) and/or polymer(s) can be high, preferably from about 1.5 to about 10.

Radiation initiated crosslinking reactions may increase to a limited degree the elastic and/or cohesive properties of the cured adhesives as it is believed the polymer network is only partially complete.

Preferred oligomer(s) and/or polymer(s) of the invention comprise polymeric backbones which are hydrophobic, vinyl copolymeric rubber components.

Without wishing to be bound by any mechanism it is believed that rubber component(s) are used because they are believed to possess very good general adhesive properties, also increased shear strength and/or may partially compensate for any effective on cohesion performance due to limited radiation cross-linking. Varying the ratio of the rubber potion of oligomer(s) and/or polymer(s) of the invention can also usefully result in changes in their surface energy, therefore, adhesive performance.

A preferred objective of the present invention is to provide backbone extended urethane (meth)acrylate oligomers/polymer(s) and method(s) of making them where the backbone comprises rubbery components. Such oligomers/polymers may be used as component(s) of radiation curable adhesives.

Another preferred objective of the invention is to provide adhesive compositions that are radiation curable (for example with actinic and/or ionizing radiation such as ultraviolet light or electron beams), more preferably with a high UV-cure speed.

A further preferred objective of the invention is to provide adhesive compositions with high solids content, more preferably substantially about 100% solids.

A still other preferred object of the invention is to provide adhesive compositions which under warm melt conditions exist in a liquid state of sufficiently low viscosity (preferably less than or equally to about 25,000 centipoise) to be able to applied as a coating to suitable substrates. Suitable warm melt conditions are at a temperature from about 40° C. to about 120° C.

A still yet other preferred objective of the invention is to provide adhesive compositions with high post cure adhesion to various substrates, particularly to substrates with low surface energy, comparable to solvent borne adhesives.

In accordance with another aspect of the present invention, a backbone extended urethane (meth)acrylate may be prepared having a backbone with a rubbery copolymer structure. The backbone may be extended during synthesis such oligomers/polymer(s) by random build up of a co-polymeric blocks linked by urethane bonds formed by reacting hydroxy and isocyanate groups.

The rubbery blocks provide, with relatively low critical entanglement chain length, therefore, relatively low melt viscosity, high tensile strength, high flexibility and/or high elasticity to a polymer.

Oligomers/polymers of the present invention may comprise rubber blocks in a non-crystalline or amorphous state. Preferred rubber blocks are of low Tg more preferably from about 85° C. to about 10° C., most preferably from about 70° C. to about 10° C.

Preferred oligomers/polymers of the invention are urethane (meth)acrylate(s) and these may be prepared in a two stage process, firstly building or extending a polymer chain backbone followed by (meth)acrylation of the backbone.

The polymer backbone may be produced and/or extended by a urethane condensation reaction between hydroxy and isocyanate groups. Hydroxyl groups may be provided by a mixture of polyols derived from rubber polyols and excess NCO groups may be provided by difunctional isocyanates. These produce as their reaction product an isocyanate terminated pre-polymer of the invention.

The length of the backbone and the number of repeat units, p, in polymers of the invention can be controlled by the stoichiometry of the reaction and the reactivity of the reactants used to prepare them. Thus for example the ratio of the equivalent number of total polyols to isocyanates can be controlled as described in George Odian, Principles of Polymerization, $3^{rd}$ Edition, John Wiley & Sons, Inc. pp 7882.

The average number of repeat units 'p' in Formula 1 is preferably from about 10 to about 50.

Preferably in urethane (meth)acrylates of the invention the backbone is substantially linear but comprising many pendent side chains. Such side chains may optionally be branched and preferably comprise from 1 to 14 carbon atoms.

In the (meth)acrylation reaction, the isocyanate group terminated prepolymer obtained in the preceding reaction is capped with hydroxyl group containing (meth)acrylates at the two ends. Sometimes, the (meth)acrylation reactions occur also on some of side chains to provide a controllable number of pendent (meth)acrylate groups.

Preferred oligomers/polymers of the invention have a z average molecular weight ($M_z$) measured by gel permeation chromatography (GPC) from about 50 to about 5,500 kilo Daltons (kDa), more preferably from about 200 to about 1,000 kDa.

Preferred polymers of the invention have a weight average molecular weight ($M_w$) measured by GPC from about 1 to about 1,000 kDa, more preferably from about 5 to about 150 kDa.

Preferred polymers of the invention have a number average molecular weight ($M_n$) of from about 1 to about 100 kDa, more preferably from about 2 to about 80 kDa, most preferably from about 10 to about 50 kDa.

The density of radiation curable functional groups in preferred polymer(s) of the invention (measured as molecular weight per (meth)acrylate group) is from about 1 to 150 kDa, more preferably from about 2 to about 100 kDa, most preferably from about 3 to about 50 kDa.

In the entire synthesis reaction according to the invention the amount of isocyanate used for urethane reactions is preferably equivalent to the total equivalent number of all polyols and hydroxyl(meth)acrylates. Conveniently from about 2% to about 10% additional isocyanate (by weight of the total isocyanate) may be added to the reaction vessel to compensate for losses from possible residual water in the reactants and moisture in the air.

Hydroxy(meth)acrylates, rubber polyols and polyisocyanates suitable for use in the invention are now described.

Hydroxyl(meth)acrylates

Any suitable hydroxyl functional ethylenically unsaturated monomer(s) may be used herein. Preferred monomer(s) are mono hydroxy functional alkyl(meth)acrylate(s); more preferably hydroxy$C_{1-10}$ alkyl(meth)acrylate(s); optionally substituted with one or more alkoxy group(s); adducts thereof with caprolactone and/or mixtures thereof.

Examples of such hydroxyl (meth)acrylate(s) comprise: 2-hydroxyethyl acrylate (HEA) and methacrylate (HEMA); 2-hydroxypropyl(meth)acrylate, 3-hydroxypropyl(meth) acrylate, 2-hydroxybutyl (meth)acrylate; 4-hydroxybutyl (meth)acrylate, 3-hydroxypentyl(meth)acrylate, 6-hydroxynonyl (meth)acrylate; 2-hydroxy and 5-hydroxypentyl (meth)acrylate; 7-hydroxyheptyl(meth)acrylate and 5-hydroxydecyl(meth)acrylate ; diethylene glycol mono (meth)acrylate, polyethylene glycol mono(meth)acrylate, propylene glycol mono(meth)acrylate, polypropylene glycol mono(meth)acrylate, and/or (meth)acrylates combining ethoxylated and propoxylated derivatives (available commercially from Cognis); caprolactone-2-hydroxyethyl acrylate adducts (such as available commercially from Dow/Union Carbide under the trademark Tone® M100); and mixtures thereof.

Rubber Derived Polyols

Suitable rubber derived polyol(s) (='rubber polyols') may comprise one or more of following and/or combinations and/or mixtures thereof: polybutadiene derived polyol(s); hydrogenated polybutadiene derived difunctional polyol(s); poly (ethylene/butylene) derived difunctional polyol(s); copolymer of butadiene-acrylonitrile derived difunctional polyol(s), or copolymer of styrene-butadiene-styrene derived difunctional polyol(s), or styrene-isoprene-styrene derived difunctional polyol(s), or copolymer of styrene-ethylene/butylene-styrene derived difunctional polyol(s), or copolymer of styrene-ethylene/propylene-styrene derived difunctional polyol(s), non-crystalline polyether glycol(s).

Preferred polybutadiene derived polyols comprise linear homopolymers produced by anionic polymerization. Examples of such polyol(s) are liquid diols of the following structure available commercially from Sartomer under the trademark Polybd® R45HTLO.

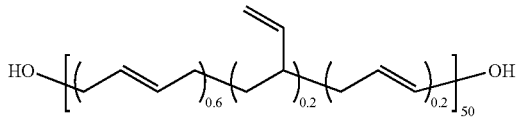

Poly bd® R45HTLO $M_w$~2,800 daltons; $OH_{av}$ 2.4 2.6; $T_g$~75° C.

These diols have primary allylic hydroxyl groups located at the ends of the polymer chain that exhibit high reactivity in either condensation reactions or the preparation of derivatives. The diols can react with isocyanates to produce general purpose urethane elastomers of the invention that can have useful properties such as: castability; inherent hydrolytic stability; resistance to acids and bases, low moisture permeability and/or excellent low temperature flexibility and ductility. Such elastomers are especially useful as adhesives.

Preferred hydrogenated polybutadiene derived polyol(s) and/or poly(ethylene/butylene) derived difunctional polyol(s) comprise linear, saturated, and homotelechelic polymers bearing terminal aliphatic primary hydroxyls at both ends. Examples of such polyol(s) are liquids of the following structure available commercially from Kraton Polymers under the trade designation Kraton Liquid L2203.

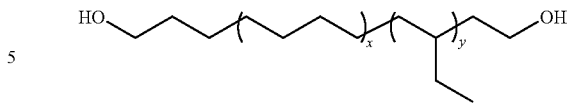

KRATON™ Liquid L2203 x+y=integer from 25 to 40; $M_w$~3,300; $OH_{av}$~1.92; and $T_g$~63° C.

These amorphous, saturated polymers with a hydrocarbon backbone can be stable and durable to weathering, hydrolysis, thermooxidative degradation, acids, bases and polar solvents. The hydrophobicity of the backbone can provide a high degree of compatibility and adhesion to polyolefins.

Preferred rubber derived polyols have an $OH_{av}$ of from about 1.9 to about 2.1, more preferably are diols. Rubber derived polyols may comprise mainly hydroxyl groups that terminate the polyol backbone Poly-Isocyanates Polymer(s) and/or formulation(s) of the present invention may be obtained and/or obtainable from one or more polyisocyanates, preferably di-isocyanates, more preferably aliphatic, cycloaliphatic, heterocyclic and/or aromatic diisocyanates. Convenient diisocyanate(s) are those which may be used to obtain polymer(s) having linear structures.

In the method of the present invention aliphatic di-isocyanates are preferred as aromatic groups absorb UV radiation during curing which reduces the speed in which the finished cured adhesive can be obtained. More preferably cycloaliphatic diisocyanates are used as these can produce polymers with a high storage modulus. If an electron beam is used to cure the adhesive then cure speed is not significantly effected and the cheaper aromatic diisocyanates are preferred over aliphatic diisocyanates.

Preferred di-isocyanates that may be used in the present invention are selected from:
alkyl (more preferably methyl) dialkylene (more preferably di-$C_{1-4}$alkylene) diisocyanate benzenes,
alkyl (more preferably methyl) diphenylene diisocyanates, optionally alkyl substituted diphenylmethane diisocyanates, alkyldiene (more preferably $C_{1-10}$alkyldiene) diisocyanates, optionally alkoxy substituted naphthylene diisocyanates
optionally where any aromatic and/or ethylenic groups therein have been partially and/or completely hydrogenated.
dimethoxybenzidine diisocyanates,
di(isocyanatoethyl)bicycloheptenedicarboxylate,
mono, or di halo(preferably bromo) toluene and phenylene diisocyanates, and/or mixtures thereof,
and/or similar and/or analogous di-isocyanates; including but not limited to isocyanate functional biurets thereof, allophonates thereof, and/or isocyanurates thereof; and/or mixtures thereof.

Examples of specific di-isocyanates that may be used in the present invention are selected from:

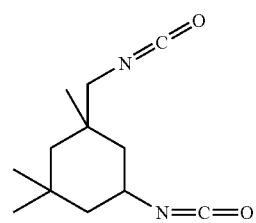

3-isocyanatomethyl-3,5,5-trimethylcyclohexylisocyanate (isophorone diisocyanate or IPDI),

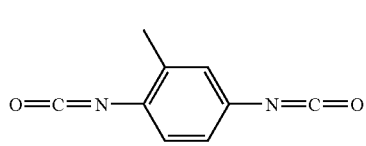

2,4-toluene diisocyanate,

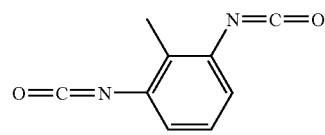

2,6-toluene diisocyanate
and/or mixtures thereof (TDI);

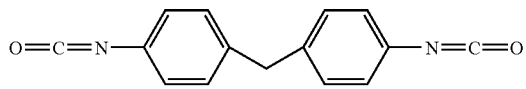

4,4'-diphenylmethane diisocyanate (MDI),

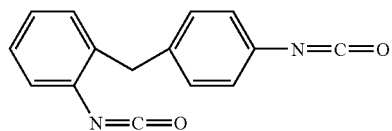

2,4'-diphenylmethane diisocyanate,

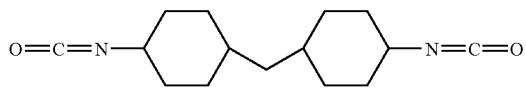

4,4'-dicyclohexyldiisocyanate or reduced MDI (also known as diclohexanemethane diisocyanate),

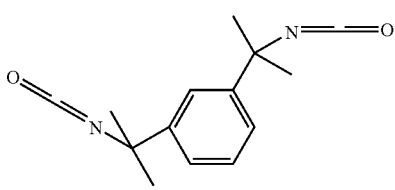

meta-tetramethyl xylene diisocyanate;

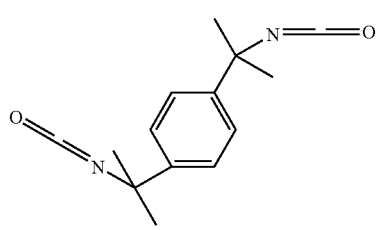

para-tetramethyl xylene diisocyanate (TXMDI) and mixtures thereof,

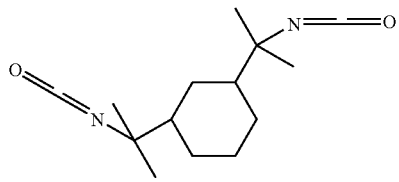

hydrogenated meta-tetramethyl xylene diisocyanate[1,3-bis (isocyanatomethyl)cyclohexane],

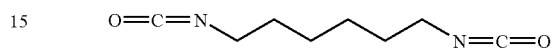

hexamethylene diisocyanate (HDI),

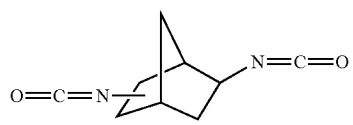

norbornane diisocyanate (NBDI),

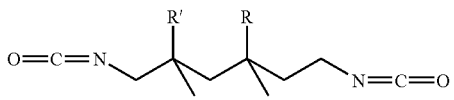

2,2,4 and 2,4,4-trimethylenehexamethylene diisocyanate (R═H, R'═CH$_3$; 2,4,4 isomer; R═CH$_3$, R'═H; 2,2,4 isomer) and/or mixtures thereof (TMDI);

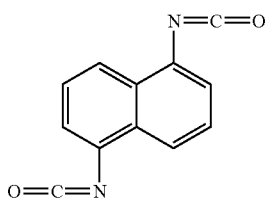

1,5-naphthylene diisocyanate (NDI),

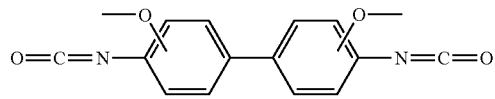

Dimethoxybenzidine diisocyanate (dianisidine diisocyanate) di (2isocyanatoethyl)bicyclo[2.2.1]hept-5-ene-2,3-dicarboxylate,

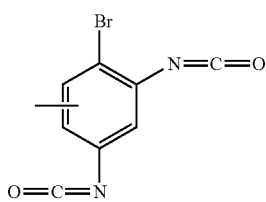

2,4-bromotoluene diisocyanates,

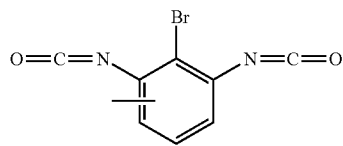

2,6-bromotoluene diisocyanates and/or mixtures thereof,

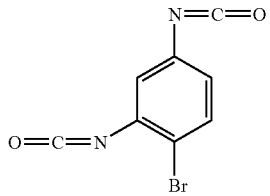

4-bromometaphenylene diisocyanate,

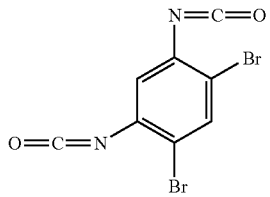

4,6-dibromometaphenylene diisocyanate,
and/or similar and/or analogous di-isocyanates; including but not limited to isocyanate functional biurets thereof, allophonates thereof, and/or isocyanurates thereof; and/or mixtures thereof.

Formulations

A further aspect of the present invention provides a radiation curable adhesive composition comprising (by weight) from about 20 to about 90%, preferably from about 30% to about 70% of one or more polymer(s) of the invention together with from about 10 to about 80%, preferably from about 30 to about 60%, of one or more tackifier(s).

Optionally formulations of the invention comprise preferably from about 0 to about 10% by weight of other additives such as antioxidant (s), UV-stabilizer(s), wetting agent(s), flowing agent(s) and/or any other additives which are known to those skilled in the art.

The mixture used to form polymers of the invention comprise preferably from about 50% to about 85% at least one of vinyl copolymer rubber based polyols, and preferably, difunctional polyols.

The mixture used to form polymers of the invention comprise preferably from about 2% to about 30%, preferably from about 5% to about 15% at least one of polyisocyanate(s), and preferably, difunctional polyisocyanates.

The mixture used to form polymers of the invention comprise preferably from about 0.1% to about 20.0%, preferably from about 0.2% to about 10.0% of at least one of hydroxyl terminated (meth)acrylates, and preferably, monohydroxyl terminated (meth)acrylates;

The mixture used to form polymers of the invention comprise preferably from about 10% to about 80%, preferably from about 15% to about 60% by weight of one or several of tackifier resins that compatible to these polymers, for example hydrocarbon tackifiers;

The mixture used to form polymers of the invention optionally comprise preferably from about 0% to about 90%, preferably from about 5% to about 30% by weight of one or several of multifunctional (meth)acrylate monomers that compatible to these polymers;

The mixture used to form the polymer of the invention comprises optionally from about 0.1% from about 10.0%, preferably from about 0.5% to about 5% by weight of photo-initiator(s), preferably from about 0.5% to about 1.5%, for example about 1.0% by weight of photo-initiator(s). Optionally, no photoinitiator is used if the formulation is to be cured by electron beam.

A process for making formulations which for example may exhibit after curing a high adhesion performance comparable with conventional solvent borne adhesives on a wide range of substrates, particularly, on low surface energy substrates. The adhesives of the invention may be useful as radiation curable pressure sensitive adhesives (PSAs) and/or as laminating adhesives.

Preferred tackifiers comprise aliphatic and/or cycloaliphatic hydrocarbon tackifier resins; optionally hydrogenated aromatic resins; mixed aromatic/aliphatic tackifier resins, terpene tackifier resins, modified hydrocarbon tackifier resins, and/or rosin ester tackifiers.

Examples of specific tackifiers may be used in the present invention are selected from:

The aliphatic and/or cycloaliphatic hydrocarbon tackifier resins available commercially from ExxonMobil under the trade marks Escorez 5300 series with soft-point from 70-150° C.; the aromatic modified aliphatic tackifier resins available commercially from ExxonMobil under the trade marks Escorez 2000 series with soft-point from 10-100° C., these tackifiers have enhanced compatibility with even more polar materials; the hydrogenated and/or partially hydrogenated aromatic resins available commercially from Eastman Chemicals under the trade marks Regalrez® 1018, 1085, 1094, 3102, 1126, and/or PMR 1100;

the hydrocarbon copolymers available commercially from Eastman Chemicals under the trade marks Kristalex® 3070, 3085 and/or PM3370;

the polymers available commercially from Arizona Chemicals under the trade marks Sylvalite® RE 80HP (rosin ester); and Sylvares® TP7042 (high softening point (145151° C.) thermally stable polyterpene phenol tackifier resin), TR 7115; TP2040 (thermoplastic terpene phenolic resin) and/or TR1085 (polyterpene resin);

the dicyclohexyl phthalate plasticizer and tackifier available commercially from Unitex Chemicals under the trade mark Uniplex® 280;

the isobornyl acrylate and isobornyl methacrylate monofunctional cross-linker and tackifier monomers available commercially from Surface Specialties UCB the difunctional urethane acrylate oligomeric cross-linker of relatively low $M_w$ available commercially from Surface Specialties UCB under the trade mark Ebecryl® 230.

Formulations of the invention may also comprise one or more of the following optional ingredients (amounts given as weight percentage of total formulation in the invention):

one or more radiation curable polymer precursor(s), preferably in an amount from 0% up to 90% one or more free radical photoinitiator(s); preferably in an amount from 1% up to about 10%;

one or more wetting agent(s); preferably in an amount from 0% up to about 8%;

one or more plasticizer(s); preferably in an amount from 0% up to about 15%;
one or more antioxidant(s); preferably in an amount from 1% up to about 10%;
one or more colorant(s), preferably in an amount from 0% up to about 40%; and/or
one or more rheology modifier(s) preferably in an amount from 0% up to about 12%.

Further aspects of the invention are described in the claims

EXAMPLES

The following non limiting examples will now be used to illustrate the invention.

Backbone extended urethane (meth)acrylate oligomers/polymers of the present invention (Examples 1 below) were prepared by reacting polyols with isocyanates, and then two ends of the backbone were capped by (meth)acrylate functional groups.

Example 1

Synthesis of Backbone-Extended Urethane (Meth)Acrylate Oligomers/Polymers

A choose of 31.25 g of Mondur ML (Bayer), diphenylmethane 4,4'-diisocyanate (MDI), and 0.43 g of DBTDL, or Dabco T-12 (Air Products and Chemicals), dibutyltin dilaurate were charged to a 2 L a round-bottomed flask. With moderate agitation, 2.90 g of HEA, 2-hydroxy ethyl acrylate (Dow Chemicals) mixed with 0.01 g MeHQ (Para-methoxyphenol) available commercially from Aldrich Chemicals was added in over 10 minutes. Begun heating to 66° C. under moderate agitation. After the temperature reached 66° C. held agitation at this temperature for 1 hour. While made a "polyol solution" by mixing 287 g of toluene (Burdick & Jack), 393.75 g of hydrogenated polybutadiene based, difunctional polyol available commercially from Kraton Polymers under the trade designation Kraton Liquid L-2203 and 0.43 g of BHT (butylated hydroxy toluene), an antioxidant available commercially from PMC Specialties under the trade designation CAO-3. The "polyol solution" was a transparent liquid. The "polyol solution" was slowly added over at 66° C. with agitation over 30-60 minutes. The exothermal phenomena should be seen, and the temperature could increase to 70-75° C. The contents of the flask were held at 66° C. for another 30 minutes, then the temperature was increased to 88° C. by heating, and the reaction was held at 88° C. for 2 hours or longer, until the level of NCO % was equal to or lower than 0.2%. 0.21 g of BHT and 0.08 g of MeHQ were post-added in. Agitated the contents at 88° C. for at least 30 minutes to ensure that the inhibitor/antioxidant completely dissolve and homogeneously distribute in the product. Turn off the heater and agitation. Pour the product out into a containers and end of synthesis.

Properties of Examples 1

The molecular weight and polydispersity of the Examples 1 were determined by conventional gel permeation chromatography (GPC) as follows. A small sample of each Example was dissolved in tetrahydrofuran (THF) and injected into a liquid chromatograph (HewlettPackard 1100 Series) equipped with PLGel polystyrenedivinylbenzene GPC columns (300×7.5 mm×10 um). The components of the sample were separated by the GPC columns based on their molecular size in solution. The components were detected by a HewlettPackard 1047A refractive index detector and recorded by Hewlett Packard HPLC Chemstation and Polymer Laboratories GPC software. Polystyrene standards of known molecular weight and narrow dispersity were used to generate a calibration curve. The results of these tests are given in the table below.

TABLE 1

Molecular Weight & Polydispersity of Examples 1

| Example 1 | $M_w$ | $M_n$ | Poly-dispersity | $M_w$ per acrylate |
|---|---|---|---|---|
| | 88,306 | 33,296 | 2.65 | 17,162 |

In general aromatic isocyanates are more reactive with polyols than non aromatic isocyanates, therefore the resultant polymers/oligomers have higher molecular weight. Higher molecular weight is believed to be beneficial to cohesion performance but the corresponding higher viscosity makes such polymers more difficult to apply as coatings.

Example 2

Formulation Based on the Invented Oligomers/Polymers of Examples 1

Three prior art commercial available PSA products were used to compare formulations of the present invention.

Comp A is a popular solvent based PSA used as a high performance adhesive.

Comp B and Comp C are two UV curable hot-melt PSAs.

Radiation curable adhesive oligomers/polymers of the invention were synthesized by the method described in Example 1 (or similarly) and were supplied as a 60% solution in toluene. A suitable mixer (except were indicated this was SpeedMixer™ Model DAC 150 FVZ available commercially from FlackTek, Inc. (Landrum, S.C.) and manufactured by Hauschild Engineering, Hamm, Germany) was used to blend the polymer solution with tackifier(s) photoinitiator(s), and/or other additive(s) to form adhesive formulations of the invention.

Generic Method for Preparing Adhesive Formulations

The polymer of the invention in solution form with 60% by weight concentration was weighted and added to a 100 g disposable cup (#501221 from FlackTek) and Tackifier 1 was weighted and added. The mixture was blended at 3,000 rpm for 3 minutes in a Speed Mixer and if necessary the mixing step was repeated up to 3 times. Tackifier 2 was weighted and added in, and mixed as above; acrylated monomer was weighted and added in, and mixed as above; and then the photoinitiator(s) was weighted and added in and mixed as above; also weighted, added and mixed as above any other ingredients if necessary. Except where indicated while the resulting formulation was still warm from mixing it was applied to a substrate using a ChemInstruments HLC101 laboratory hot melt coater to form an adhesive coating. The coat web was transported using the ChemInstruments Laboratory Laminator LL100 bench top laboratory laminator.

TABLE 2

Formulation (with Polymer of Example 1)

| | |
|---|---|
| Example 1 (dried or neat) | 39.41% by weight |
| ESCOREZ ® 5380 (tackifier 1) | 44.33% by weight |
| ESCOREZ ® 2520 (tackifier 2) | 9.85% by weight |
| HDODA (monomer) | 4.93% by weight |
| Irgacure ® 184 (photoinitiator) | 0.99% by weight |
| Irganox ® 1010 (antioxidant) | 0.49% by weight |
| Total | 100.00% by weight |

Compatibility

Polymers of the invention were found to be compatible with conventional tackifying agents plasticizers used in PSAs even at concentrations up to 60% in formulations. Various adhesive formulations were prepared confirming: physical compatibility of the tackifiers with the resin, UV cure reactivity (that the formulation cured with 1% to 10% of photoinitiator based on the total weight of formulations) and general suitability as a PSA (after first pass curing the formulation gave sufficient tack or shear strength). For example each of the specific tackifiers mentioned previously herein were used to prepare clear coating films at an amount of from 20 to 60 weight percent of the tackifier.

Thermal Stability

Thermal stability tests were directly conducted on the formulation based on oligomer/polymer of Example 1 in order to determine the thermal stability of the oligomers/polymers under the real application conditions. The formulation and the procedures for preparation of formulations are described in the ensuing paragraph. Toluene solvent was removed from the Example 1-based formulation by heating the sample at 80° C. under reduced pressure (50 mbar).

In general, the thermal stability of a radiation curable resin system is determined by measuring the viscosity increase of a sample after aging the sample at an elevated temperature for a specified time. Two commonly used procedures in the radiation curable resin area report results as the percent viscosity change or pass/fail.

A percent viscosity change of ≦20% after 7 days at 60° C. is considered a pass, >20% is considered a fail.

A percent viscosity change of ≦100% after 2 days at 93.3° C. is considered a pass, >100% is considered a fail.

In the present invention, the thermal stability of the Example 1-based formulation was determined by measuring viscosity changes after the resin sat in the oven (at 80° C. and 120° C., respectively) for 24 hours. These conditions are considered well within those expected for warm melt coating process. Results are listed below in Table 3

TABLE 3

Thermal Stability of Example 1 based Formulation

| Temperature (° C.) | Time (0 hrs) | Viscosity Change (%) after 24 hours | Pass/Fail |
|---|---|---|---|
| 80 | 118,000 (cPs) | <10.0% | Pass |
| 120 | 7,850 (cPs) | <50.0% | Pass |

Rheology

The ability of the polymer of Example 1-based formulations to coat a substrate was determined by rheology studies under warm melt conditions.

Rheology of cured PSA was evaluated on a TA Rheometer, Model AR 2000, using 8 mm ETC parallel plates with normal force control (no temperature gap compensation). Samples were properly conditioned then evaluated at −100 to +200 deg. C. at 3 deg. C. per minute temperature ramp, using a rheometer frequency of 1 Hz and 0.025% (1.5 $e^4$ Rad.) controlled strain. Best results were obtained using samples prepared by rolling ca. ¼ in. strips of cured, conditioned adhesive film to a diameter of ca. 8 mm which were then placed in the rheometer fixture. Conditioning typically involved inserting the specimen and setting the gap (ca 5000μ) at room temperature, warming the specimen to 100° C. at a constant gap, then cooling the specimen with normal force control (0.3±0.1) to about −70° C. At this point the specimen was trimmed, if necessary, to the diameter of the 8 mm fixture diameter, before cooling to the test starting temperature of −100° C.

Rheological properties provide a useful guide to whether resins or formulations are suitable adhesives. Temperature dependence of the following dynamic moduli were measured including: storage (shear) modulus; loss (adhesive failure) modulus; and loss tan(δ) (loss/storage modulus).

Without wishing to be bound by any mechanism the applicant believes that these dynamic measurements cover the glassy state at low temperature, the glass transition range with strong decrease of both moduli, and a temperature range where both moduli decrease more gradually with rising temperature. Just above the glass transition range the viscoelastic behavior is governed by entanglements. The gradual decrease over broad temperature range is a typical phenomenon for a polymer with a very broad molecular weight distribution. The pronounced increase of loss modulus may be caused by the fact that the material is more easily deformed with increasing temperature, and can develop contact during a short contact time. The decrease of loss modulus at higher temperature is connected with the debonding process and correlates with the ability of a polymer to dissipate energy. It usually has a maximum in the glass transition range, and decreases at higher temperature. The position of tack maximum is related to $T_g$ while other parameters such as molecular weight and cross-linking density also influence this.

The various rheological properties of certain adhesives were measured and compared Comp A (prior art solvent based PSA); Comps B & C (two prior art UV cured PSAs); Examples 2 (the formulation based on polymers of the invention). The rheology data (calculated from graphs of various moduli versus temperature—not shown) shows that Example 2 and Comp A have similar adhesion performance but Example 2 has higher tack (higher tan(δ)).

Toluene solvent was removed from Example 2 by heating the sample at 80° C. under reduced pressure (50 mbar). The sample remained stable and at room temperature, the formulated material with 100% solids was a very viscous liquid whose viscosity depended on temperature as shown in Table 4.

TABLE 4

Temperature Dependent Viscosity of Example 2

| | Temperature (° C.) | | | | | |
|---|---|---|---|---|---|---|
| | 65 | 80 | 90 | 100 | 110 | 120 |
| Viscosity (cPs) | 384,000 | 118,000 | 58,100 | 31,900 | 14,500 | 7,850 |

Performance as PSAs

The performance of oligomers/polymers of the invention as PSAs was tested in the following manner.

Test Sample Preparation

All tapes for the PSA results herein were made by adhesive transfer. The uncured, liquid PSA was drawn down on release paper (Loparex Poly Silk 111/120, Apeldoorn, The Netherlands, roll No. W03180672), and UV cured as described in herein.

Drawdowns were made by Gardco Automatic Drawdown Machine, 12 in stroke, on the slowest speed (ca. 4.6 fpm), using a Braive Instruments adjustable Bird applicator, typically at 130μ setting.

The drawdown adhesives were then cured in air using two 600-watts per inch (W/inch) Fusion mercury vapor electrodeless UV lamps at 150 fpm (350 mJ/cm$^2$) using nominal adhesive film thicknesses of 2 mil.

The cured adhesive on release paper was warmed in a 68±10 deg. C. oven for 30 minutes, and then evacuated for 1 hour. The cooled film was laminated with polyester film (Pilcher Hamilton Corp, 200 gauge, control no. 787 7222) using two double passes of an 8 inch hard rubber roller (5.03 Kg with handle held horizontally). The laminate was trimmed, cut into strips 1 inch by approximately 7 inches and conditioned in a constant temperature room before testing.

Adhesive film thickness was determined by nondestructive testing using a ChemInstruments (Fairfield, Ohio) Micrometer MI1000, which was calibrated before each set of measurements. Thickness values are the mean of 5 measurements each on three randomly selected strips (of usually 79 produced), and were reported to the nearest one hundred thousandth of an inch (0.01 mil).

PSA Testing

All room temperature performance testing was conducted in a constant temperature/constant humidity controlled room held at 23±2 deg. C., 50±5 percent relative humidity. Conditions were monitored by an Enercom Instruments Ltd. (Toronto, ON, Canada) weekly strip chart. Test methods were standard methods as developed by the Specifications and Technical Committee of the Pressure Sensitive Tape Council (Glenview, Ill.), Eighth Edition Loop tack was measured on a ChemInstruments LT500, according to standard procedure on stainless steel substrate, see PSTC16B. See also ASTM D 6619597, Test Method B. Results are reported as pounds per square inch, with standard deviation.

Peel testing was done on a Mass SP 2000 Slip/Peel Tester (Instrumentors, Inc., Strongsville, Ohio), according to PSTC101A on stainless steel substrate. One inch by 5 inch tapes were rolled onto stainless steel panels using the ChemInstruments rolldown machine at 12 in./min roller speed, two double passes per specimen. Peel tests were conducted at 20 minutes and at >24 hours after application of tape to the test panel. Results were reported in pounds per linear inch. Standard deviation is reported in parentheses behind the peel strength values.

Shear strength was divided as room temperature shear strength and high temperature shear strength. It was measured on a ChemInstruments 30 Bank Shear Tester with 2 Kg weights, according to PSTC107A on stainless steel substrate at room temperature (25° C.), and with 1-Kg weights at 93° C. (200 F), respectively.

desirable to carefully balance viscosity with molecular weight and molecular weight per (meth) acrylate group.

Some of the examples tested were show reasonably high adhesion performance and viscosities which are suitable to be applied as a warm melt coating.

Differences in PSA performance caused by surface-cure and through-cure are another concern in UV-PSA applications, particularly, for thick film application such as 5 mil (125 µm) and higher thickness. Peel strength measurements in Table 5 demonstrate that Example 2 shows good homogeneous cure. The adhesive surface directly exposed to UV radiation with a UV dose of 950 mJ/cm$^2$, and the surface against the stock-film which was not directly exposed to UV radiation exhibit similar peel strength. This may suggests that the surface facing to UV and the surface not facing to UV-radiation achieve a similar degree of UV cure.

TABLE 6

Peel Strength Data of Top and Bottom Surface on Stainless Steel Panel

| Peel Strength (pli) | Top Surface (directly exposed to UV radiation) | Bottom Surface (Indirectly exposed to UV radiation) |
|---|---|---|
| 20 minute | 4.3 | 4.6 |
| 24 hours | 5.2 | 5.2 |

(Adhesive thickness: 4.5 mils. UV-cured with UV dose of 0.95 J/cm2)

Peel strength measurements in Table 7 also demonstrate that Example 2 shows PSA performance is comparable to that of solvent borne adhesives to various substrates, particularly to substrates with low surface energy.

TABLE 7

Adhesion of Example 2 to Polypropylene with Low Surface Energy

| Peel Strength (pli) | 0.95 (UV Dose, J/cm$^2$) | 1.35 (UV Dose, J/cm$^2$) |
|---|---|---|
| 20 minutes | 3.3 | 2.2 |
| 24 hours | 4.8 | 4.9 |

TABLE 5

PSA Performance Results using 2 mil PET Film (AT) on Stainless Steel Substrate*

| Example | Loop Tack psi | 20 min Peel (pli) | 24 h Peel (pli) | Shear, hr (25° C., 1 Kg) | Shear, hr (25° C., 2 Kg) | Shear, hr (93° C., 1 Kg) | Remarks |
|---|---|---|---|---|---|---|---|
| Comp A | 2.6 (0.1) | 3.5 (0.1) | 3.9 (0.1) | 200+ | 160+ | 8 | Solventbased PSA |
| Comp B | 1.6 (0.1) | N/A | 2.7 (0.0) | 22 | 0.0 | N/A | UVcurable PSA |
| Comp C | 1.6 (0.0) | 2.5 (0.1) | 2.9 (0.1) | 183 | 0.0 | N/A | UVcurable PSA |
| Example 2 | N/A | 4.1 (0.1) | 4.4 (0.1) | 200+ | 101 | 200+ | Invented UV-PSA |

*Adhesive thickness: 2. mil.

Formulations of the invention show a higher performance than those of prior art UV curable PSAs (Comps B & C) and show comparable performance to a prior art solvent based PSA (Comp A).

To prevent low tack and low adhesion, it is preferred that the UV cross linking density is low (i.e. the molecular weight per (meth)acrylate functional group is high). To maintain high cohesion with a low density of UV cross links it is preferred that the oligomers/polymers are of relatively high molecular weight. As viscosity increases exponentially with molecular weigh for optimum adhesive performance it is

The invention claimed is:

1. A polymer of Formula 1:

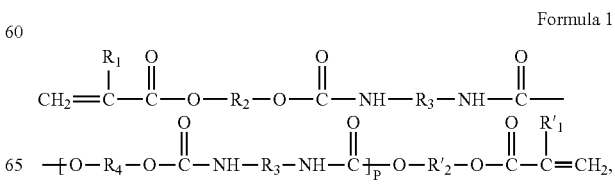

Formula 1 where:

$R_1$ and $R'_1$ are each independently hydrogen or $C_{1-20}$hydrocarbo, $R_2$, $R'_2$, and $R_3$ are each independently $C_{1-36}$ hydrocarbylene optionally substituted with one or more carboxy, sulpho, hydroxyl, amino, mercapto, cyano, methyl, halo, trihalomethyl or methoxy groups, $R_4$ is an organo residue obtained from one or more difunctional polyols with 2 hydroxyl functional groups at the end of chains, said polyols being homo- and/or co-vinyl polymer rubbers optionally substituted with one or more carboxy, sulpho, hydroxyl, amino, mercapto, cyano, methyl, halo, trihalomethyl or methoxy groups, and p is an integer from about 6 to about 100.

2. The polymer as claimed in claim 1, where $R_1$ and $R'_1$ are the same and/or $R_2$ and $R'_2$ are the same.

3. The polymer as claimed in claim 1, where $R_1$ and $R'_1$ are each independently hydrogen or $C_{1-10}$alkyl.

4. The polymer as claimed in claim 3, where $R_1$ and $R'_1$ are each independently hydrogen or methyl.

5. The polymer as claimed in claim 1, where $R_2$ and $R'_2$ are each independently $C_{1-4}$alkylene.

6. The polymer as claimed in claim 1, where $R_3$ is an organo residue of one or more aliphatic, cycloaliphatic, heterocyclic or aromatic diisocyanates.

7. The polymer as claimed in claim 6, where $R_3$ is the organo residue of 4,4'-diphenylmethane diisocyanate.

8. The polymer as claimed in claim 1, where $R_4$ comprises an organo residue obtained from one or more difunctional polyols with two hydroxyl groups at the end of chains obtained from copolymerization of ethylene-butylene, or homopolymerization of butadiene, or hydrogenation of polybutadienes, or copolymerization of butadiene-acrylonitrile, or copolymerization of styrene-butadiene-styrene, or styrene-isoprene-styrene, or styrene-ethylene/butylene-styrene, or styrene-ethylene/propylene-styrene.

9. The polymer as claimed in claim 8, where $R_4$ has the Formula 2:

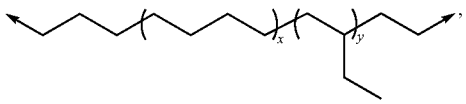

Formula 2 where x and y together add to form about 25 to about 40 and the arrows denote linking bonds where $R_4$ attaches to the polymer backbone.

10. The polymer as claimed in claim 1, which has a 'z' average molecular weight ($M_z$) measured by gel permeation chromatography (GPC) from about 50 to about 5,500 kilo Daltons (kDa).

11. The polymer as claimed in claim 1, which has a weight average molecular weight ($M_w$) measured by GPC from about 1 to about 1,000 kDa.

12. The polymer as claimed in claim 1, which has a number average molecular weight ($M_n$) of from about 1 to about 100 kDa.

13. The polymer as claimed in claim 1, which has a density of radiation curable functional groups measured as molecular weight per (meth)acrylate group from about 1 to 150 kDa.

14. The polymer as claimed in claim 1, where $R_2$, $R'_2$ and $R_3$ are each independently $C_{1-36}$ hydrocarbylene and $R_4$ is an organo residue obtained from one or more difunctional polyols with 2 hydroxyl functional groups at the end of chains, said polyols being homo- and/or co-vinyl polymer rubbers.

15. A method of preparing a polymer as claimed in claim 1, comprising the steps of:

(a) reacting a hydroxyl functional copolymer of ethylene-butylene, or hydrogenated polybutadiene, or homopolymer of butadiene, or copolymer butadiene-acrylonitrile, or copolymer of styrene-butadiene-styrene, or styrene-isoprene-styrene, or styrene-ethylene/butylene-styrene, or styrene-ethylene/propylene-styrene with one or more different types of diisocyanates in order to prepare an isocyanate terminated prepolymer, (b) said isocyanate terminated prepolymer of step (a) being capped with hydroxyl group containing (meth)acrylates at the two ends.

16. A radiation curable adhesive formulation comprising from about 20% to about 90% (by weight) of one or more polymer(s) as claimed in claim 1; together with from about 10% to about 80%, of one or more tackifier(s).

17. A process for making pressure sensitive adhesives or laminating adhesives wherein a polymer as claimed in claim 1 is applied to a substrate and then subjected to electromagnetic radiation.

18. A process for making pressure sensitive adhesives or laminating adhesive wherein a radiation curable formulation as claimed in claim 16 is applied to a substrate and then subjected to electromagnetic radiation.

* * * * *